July 13, 1954

H. S. CARNEGIE ET AL 2,683,846

ELECTRIC MOTOR CONTROL SYSTEM

Filed Jan. 2, 1951

2 Sheets-Sheet 1

WITNESSES:
E. A. M?Closkey.
C. F. Oberheim.

INVENTORS
Herbert S. Carnegie
and Harry Dolan.
BY
Paul E. Friedemann
ATTORNEY

INVENTORS
Herbert S. Carnegie
and Harry Dolan
BY
Paul E. Friedemann
ATTORNEY

Patented July 13, 1954

2,683,846

UNITED STATES PATENT OFFICE 2,683,846

ELECTRIC MOTOR CONTROL SYSTEM

Herbert Stirling Carnegie and Harry Dolan, Stafford, England, assignors to The English Electric Company Limited, London, England, a British company Application January 2, 1951, Serial No. 203,896

Claims priority, application Great Britain January 2, 1950

5 Claims. (Cl. 318—229)

This invention relates to electric motor control systems. It is concerned with a system for controlling the speed of a slip-ring induction motor whereby a substantial rise of speed above a desired speed, determined by the setting of a motor speed regulator is prevented.

The control system according to the invention comprises a speed regulator in the secondary circuit of the motor, an electro-magnetic brake mechanically connected to the motor and arranged to be excited in response to increase of motor speed above a desired speed, dependent on the setting of the speed regulator, and saturable reactor means having A. C. windings in each phase of the supply to the motor arranged to reduce the applied voltage in response to said increase of speed.

The electro-magnetic brake is preferably of the kind comprising a stationary member and a driving member, one of the members comprising a field system having a D. C. exciting winding thereon and the other a secondary system in which current is induced due to relative rotational movement between it and the field system.

According to a further feature of the invention the regulator is further arranged to control the reactor means so as to vary the applied voltage directly in accordance with the desired speed.

According to a still further feature of the invention, in the case of a 3-phase slip-ring induction motor the A. C. windings of two phases of the saturable reactor are each in two sections connected to form a bridge circuit, one diagonal of which is connected to the supply and the other to the motor, the regulator being arranged so that movement in one direction from a neutral position progressively reduces the reactance of the windings constituting one pair of opposing arms of the bridge circuit and of the third winding, whilst movement in the other direction progressively reduces the reactance of the windings constituting the other two arms of the bridge circuit and of the third winding whereby, not only is the applied voltage varied, but the phase sequence of the voltages, and thus the direction of rotation of the motor, is made dependent on the direction of movement of the regulator.

Figure 1:
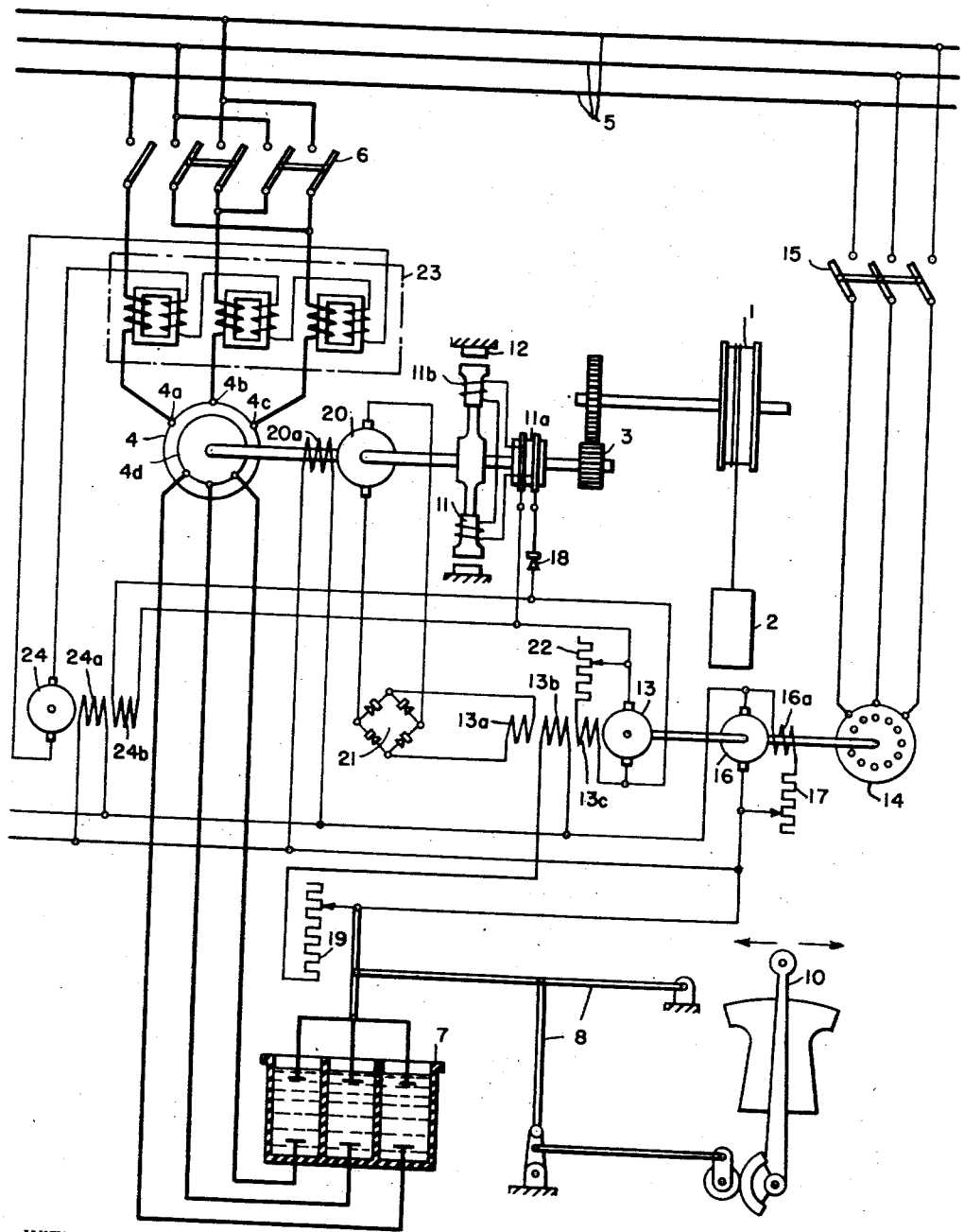
Figure 2:
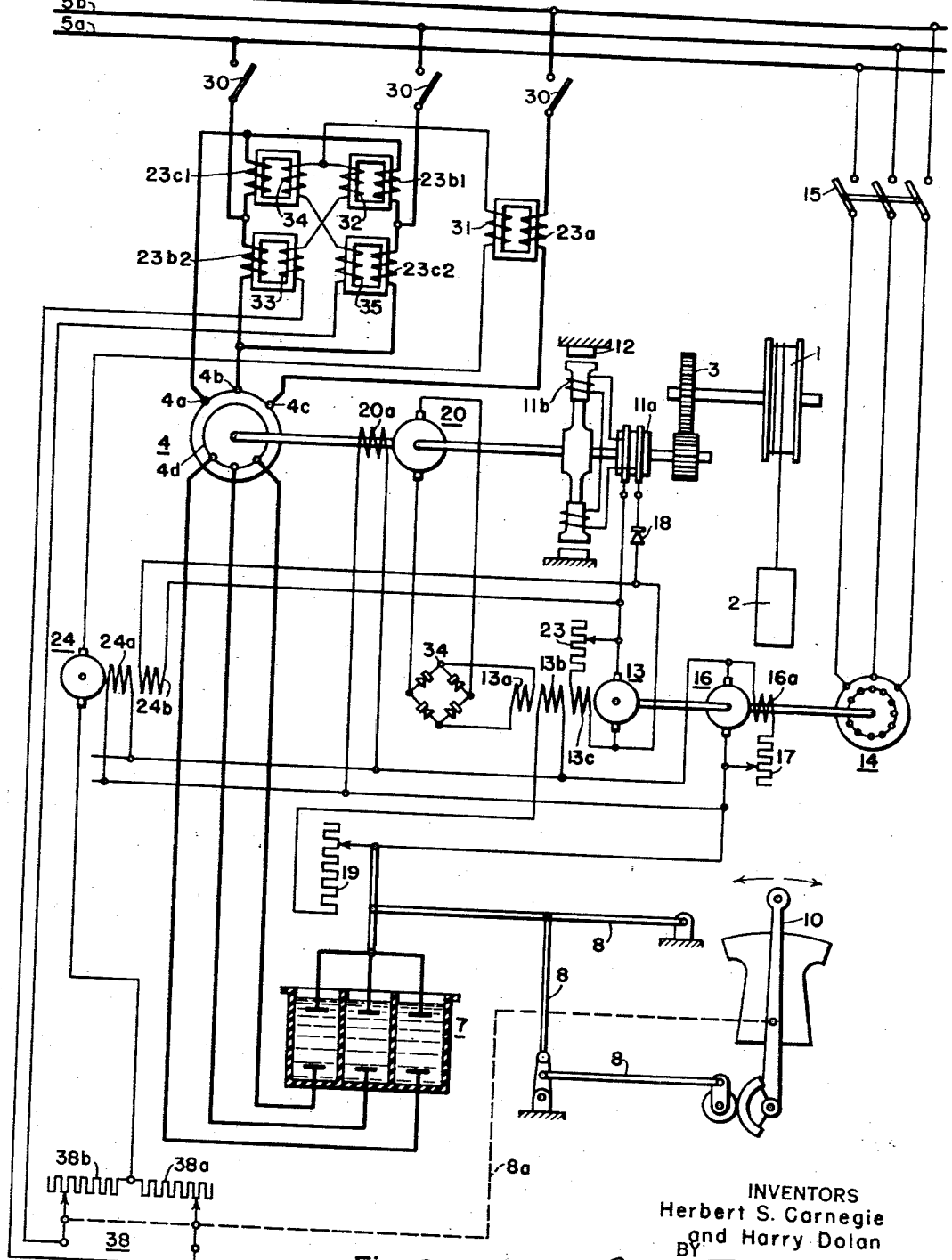

Other features of the invention will be apparent from the following description with reference to Figs. 1 and 2 of the accompanying drawings where there are shown two alternative methods of carrying out the invention.

Each figure illustrates the invention as applied to the control of an A. C. motor driving a mine winding gear or the like.

Referring now to Fig. 1, the winding drum 1, hoisting and lowering the load 2, is driven through gearing 3 by a three-phase A. C. slip-ring induction motor 4 supplied from A. C. mains 5 through a reversing switch 6. Connected across the slip-rings and brushes 4a of the motor is a speed regulator 7 actuated by a manually operated controller 10 arranged so that movement of the controller to either side of its mid position reduces the resistance in circuit.

The winding gear is provided with an electromagnetic brake which includes a field system 11, driven by the motor, and a co-operating stationary secondary system 12 in which eddy currents are induced by rotation of the field system. An exciting winding 11b on the field system is supplied with direct current through slip-rings 11a and a metal rectifier 18 from a differential exciter 13 driven by a three-phase induction motor 14. This motor is supplied from the A. C. mains 5 through a switch 15 and also drives a substantially constant voltage exciter 16 which is itself excited by a shunt field winding 16a having in series therewith a field regulating resistance 17.

The field winding 13b of the exciter 13 is fed from the exciter 16 through a rheostat 19 coupled to the controller 10 so that as resistance is cut out of the secondary circuit of the motor 4 the excitation due to the field winding 13b is increased. The other component of excitation is provided by the field winding 13a which opposes the winding 13b and is supplied from a tachometer generator 20 driven by the motor 4, a bridge rectifier 21 being included in the circuit to ensure that the current in this field is always in the same direction irrespective of the direction of rotation of the motor 4. The field winding 20a of the tachometer is supplied from the exciter 16.

The rectifier 18 in circuit with the brake field winding 11b is arranged to prevent excitation of the winding except when the excitation applied to the differential exciter by field winding 13a exceeds that applied by winding 13b, i. e. except when the motor speed exceeds a value dependent on the setting of the controller 10. When the motor 4 has been accelerated and the controller 10 is in the full speed position the excitation produced by the winding 13b is such that the brake field winding 11b will not be excited unless the motor speed exceeds the synchronous speed of the motor. When the controller 10 is in the "off" position and the motor 4 is at rest no current will flow through the brake exciting winding 11b, but if the load should drive the motor 4—e. g. due to removal of a mechanical brake—the field winding 13a of the exciter 13 will be energized from the tachometer generator 20 and the brake will be fully excited at a comparatively low speed of the motor. The effect of the exciter 13 is enhanced by a self-excited shunt field winding 13c in series with a field regulating resistance 22.

Included in series relationship in the input circuit of the motor 4 is a three-phase saturable reactor, generally indicated at 23, the D. C. windings of which are connected in series across an exciter 24. Field winding 24a of this exciter is supplied from the exciter 16, whilst field winding 24b is supplied from the exciter 13. This latter field winding is arranged so that it assists the winding 24a when the excitation applied to the exciter 13 by the winding 13b exceeds that applied by the winding 13a and opposes the field winding 24a when the conditions on the exciter 13 are reversed.

The exciter 24 is designed so that with only the winding 24a energized, a voltage is generated which is just sufficient to saturate the reactor 23 and so long as the excitation of the exciter 13 due to the winding 13b exceeds that due to the winding 13a, i. e. so long as the speed of the motor 4 does not exceed the desired value, maximum voltage will be applied to the motor. If, on the other hand, the excitation applied to the exciter 13 due to the winding 13a exceeds that due to the winding 13b, indicating that the motor speed is in excess of the desired value, the excitation due to the winding 24b will be reversed and the output of the exciter reduced. The saturable reactor 23 will therefore become less saturated to an extent dependent on the amount of overspeed of the motor and the voltage applied to the motor will be reduced. Thus when conditions are such that the brake field winding 11b is excited, i. e. when more power is being supplied to the motor than is necessary for any particular load, the motor input voltage, and the power wasted in the brake is automatically reduced.

With this arrangement a load can be lowered, if desired, without connecting the motor to the supply, the controller 10 determining the speed of the motor solely by excitation control of the brake field winding 11b.

Referring now to Fig. 2, where like parts are given like references, the reversing switch 6 of Fig. 1 is replaced by an isolating switch 39 and the saturable reactor 23 has one A. C. winding 23a connected directly between the line 5c of the supply 5 and the terminal 4c of the motor, whilst the other two A. C. windings are each in two sections 23b$^1$, 23b$^2$ and 23c$^1$, 23c$^2$ respectively, connected as the opposite arms of a bridge circuit. One diagonal of this bridge circuit is connected across the lines 5a and 5b of the supply, whilst the other diagonal is connected to the terminals 4a and 4b of the motor.

The D. C. windings of the saturable reactor are indicated at 31, 32, 33, 34 and 35 respectively. Windings 32 and 33 are connected in series with winding 31 and the leg 38a of a twin regulator 38 across the exciter 24, whilst windings 34 and 35 are connected in series with winding 31 and the other leg 38b of the regulator 38 across the exciter. The regulator 38 is ganged to the controller 10 so that with movement of the controller in one direction from the "off" position, the amount of resistance in the leg 38a is progressively reduced, whilst with movement in the opposite direction the amount of resistance in the leg 38b is progressively reduced.

Braking of the motor by the electro-magnetic brake is obtained in this arrangement in exactly the same manner as in the arrangement shown in Fig. 1, the brake field winding 11b being energized from the exciter 13 whenever the motor speed exceeds a value predetermined by the position of the regulator 19. The voltage applied to the motor and the phase sequence of the input is, however, in this arrangement also dependent on the setting of the controller 10. Thus with the controller in the "off" position the maximum resistance of both legs of the regulator 38 is included in series with the D. C. windings 31–35 of the saturable reactor so that its reactance is a maximum. The voltage applied to the motor is therefore a minimum.

If the controller 10 is moved in a direction such that the resistance in the leg 38a of the regulator 38 is reduced, then the excitation of the D. C. windings 31, 32 and 33 of the saturable reactor will be increased to an extent dependent on the movement of the controller. The reactance of the windings 23a, 23b$^1$ and 23b$^2$ will accordingly be reduced, the reactance of the windings 23c$^1$ and 23c$^2$ remaining unchanged. The bridge circuit will accordingly be unbalanced by an amount dependent on the movement of the controller so that the potential at the motor terminal 4a will be nearer that of the line 5b, whilst the potential of the motor terminal 4b will be nearer that of the line 5a.

Conversely, when the controller 10 is moved in the opposite direction, the potential at the motor terminal 4a will approach that of the line 5a, whilst the potential at the motor terminal 4b will approach that of line 5b. In both cases the potential of the motor terminal 4c will be increased and the motor will be energized by a three-phase voltage and produce a three-phase torque, the direction of rotation being dependent on which way the controller is moved.

At any setting of the controller 10 the voltage applied to the motor will be automatically decreased by the exciter 24 if the motor speed should exceed the predetermined value, as in the arrangement shown in Fig. 1.

If desired, manual control of motor input voltage may be obtained in the arrangement according to Fig. 1 by inserting a variable resistance in circuit with the D. C. windings of the saturable reactor. The resistance would be coupled to the controller 10 and arranged so that movement of the controller in either direction from the "off" position reduces the amount of resistance in circuit. In this arrangement the reversing switch would still be necessary for reversing the direction of rotation of the motor.

What we claim as our invention and desire to secure by Letters Patent is:

1. In a control for an alternating current motor having an alternating current supply circuit, the combination of, variable impedance means adapted for connection in the supply circuit for controlling motor voltage, a generator driven at constant speed and having the output thereof connected to said variable impedance means to effect a control of the impedance thereof, said generator having a pair of field windings of which one is adapted to be excited with constant direct current, electrical means responsive to motor speed, and circuit means including said electrical means for cumulatively exciting the other field winding with respect to said one field winding, when motor speed is below a predetermined level and differentially exciting said other field winding when motor speed is above said predetermined level.

2. In a control for an alternating current motor having an alternating current supply circuit, the combination of, respective saturable reactors adapted for connection in the respective lines of the motor supply circuit, each saturable reactor having a control winding, a generator driven at constant speed and having a pair of field windings, circuit means connecting the output of said generator to said control windings, one generator field winding being adapted for excitation with constant direct current, electrical means responsive to motor speed, and circuit means including said electrical means for cumulatively exciting the other generator field winding with respect to said one field winding when the motor speed is below a predetermined level and differentially exciting said other field winding when the motor speed exceeds said predetermined level.

3. In a control for an alternating current motor having an alternating current supply circuit, the combination of, respective saturable reactors adapted for connection in the respective lines of the motor supply circuit, each saturable reactor having a control winding, a generator driven at constant speed and having a pair of field windings, one generator field winding being adapted for excitation with constant direct current, electrical means responsive to motor speed for producing a voltage which varies in dependence of motor speed, circuit means for differentially combining the speed voltage with a reference voltage, said last-named circuit means being connected with the other control field winding of said generator to cumulatively excite said other field winding, with respect to said one field winding when said reference voltage is the larger and to differentially excite said other field winding with respect to said one field winding when the speed voltage is the larger.

4. In a control for an alternating current motor having an alternating current supply circuit, the combination of, respective saturable reactors adapted for connection in the respective lines of the motor supply circuit, each saturable reactor having a control winding, a constant speed generator having a pair of field windings, circuit means connecting the output of said generator to said control windings, one generator field winding being adapted for excitation with constant direct current, an amplifier having a pair of differentially related control circuits, circuit connections for applying a reference voltage to one control circuit, electrical means responsive to motor speed for applying a voltage varying in dependence of motor speed to the other control circuit and circuit means connecting said amplifier to the other field winding of said generator to cumulatively excite said other field winding with respect to said one field winding when said reference voltage predominates and to differentially excite said other field winding with respect to said one field winding when said speed voltage predominates.

5. Apparatus as set forth in claim 4 in which said amplifier comprises a generator having a pair of differentially related control field windings.

References Cited in the file of this patent

UNITED STATES PATENTS

| Number | Name | Date |
|---|---|---|
| 1,871,689 | Higbee | Aug. 16, 1932 |
| 2,299,911 | Logan | Oct. 27, 1942 |
| 2,401,164 | King et al. | May 28, 1946 |
| 2,440,319 | Wickerham | Apr. 27, 1948 |
| 2,445,095 | Winther | July 13, 1948 |
| 2,462,751 | Koehler | Feb. 22, 1949 |